US012609905B1

(12) United States Patent
Cai et al.

(10) Patent No.: US 12,609,905 B1
(45) Date of Patent: Apr. 21, 2026

(54) TELECOMMUNICATION USING ARTIFICIAL INTELLIGENCE (AI) AGENTS AND GENERATIVE AI MODELS

(71) Applicant: T-Mobile USA, Inc., Bellevue, WA (US)

(72) Inventors: Zheng Cai, Fairfax, VA (US); Zheng Fang, McLean, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 49 days.

(21) Appl. No.: 18/830,503

(22) Filed: Sep. 10, 2024

(51) Int. Cl.
  *G06F 15/16* (2006.01)
  *H04L 41/16* (2022.01)
  *H04L 51/08* (2022.01)

(52) U.S. Cl.
  CPC .............. *H04L 51/08* (2013.01); *H04L 41/16* (2013.01)

(58) Field of Classification Search
  CPC ....................................................... H04L 41/16
  USPC ................................................. 709/204, 206
  See application file for complete search history.

(56) References Cited

U.S. PATENT DOCUMENTS

| | | | |
|---|---|---|---|
| 10,587,933 | B2 | 3/2020 | Parks |
| 11,004,013 | B2 | 5/2021 | Eisenzopf |
| 11,552,914 | B2 | 1/2023 | Sharon et al. |
| 11,687,633 | B2 | 6/2023 | Kwatra et al. |
| 11,726,803 | B2 | 8/2023 | Bradfield |

| | | | |
|---|---|---|---|
| 11,809,688 | B1 | 11/2023 | Parasnis et al. |
| 11,934,789 | B2 | 3/2024 | Hutchins |
| 11,943,184 | B2 | 3/2024 | Back et al. |
| 11,947,893 | B1 | 4/2024 | Seth |
| 11,947,902 | B1 | 4/2024 | Grimshaw et al. |
| 11,962,546 | B1 | 4/2024 | Hattangady et al. |
| 11,966,698 | B2 | 4/2024 | Okonkwo et al. |
| 12,010,184 | B1 | 6/2024 | Bhatt et al. |
| 12,013,891 | B2 | 6/2024 | Aykut et al. |
| 12,033,265 | B2 | 7/2024 | Gelfenbeyn et al. |
| 2008/0208787 | A1 | 8/2008 | Luchene |
| 2021/0117864 | A1 | 4/2021 | Weast et al. |
| 2021/0241873 | A1 | 8/2021 | Kapaldo |
| 2021/0382754 | A1 | 12/2021 | Nimmagadda et al. |
| 2022/0036153 | A1 | 2/2022 | O'malia et al. |
| 2023/0351118 | A1 | 11/2023 | Gelfenbeyn et al. |
| 2023/0351142 | A1 | 11/2023 | Gelfenbeyn et al. |

(Continued)

FOREIGN PATENT DOCUMENTS

| | | |
|---|---|---|
| CN | 112424713 A | 2/2021 |
| CN | 112508750 A | 3/2021 |

(Continued)

*Primary Examiner* — Wing F Chan
*Assistant Examiner* — Andrew Woo
(74) *Attorney, Agent, or Firm* — Perkins Coie LLP

(57) ABSTRACT

An artificial intelligence (AI) agent on a computer device determines that digital content has been attached to or embedded in a message for transmission to another computer device by a software application. The digital content was generated using a prompt input to a generative AI model stored on the computer device. The prompt is retrieved from the generative AI model. The digital content is removed from the message and replaced with the prompt. The computer device transmits the message to the other computer device via a telecommunications network for another AI agent executing on the other computer device to re-generate the digital content using the prompt.

20 Claims, 6 Drawing Sheets

(56)                    References Cited

U.S. PATENT DOCUMENTS

| | | |
|---|---|---|
| 2023/0351217 A1 | 11/2023 | Gelfenbeyn et al. |
| 2023/0418524 A1 | 12/2023 | Darji et al. |
| 2024/0095491 A1 | 3/2024 | Birru et al. |
| 2024/0104457 A1 | 3/2024 | Coles et al. |
| 2024/0111992 A1 | 4/2024 | Vichare et al. |
| 2024/0113930 A1* | 4/2024 | Zhao .................... G06Q 30/015 |
| 2024/0160902 A1 | 5/2024 | Padgett et al. |
| 2024/0185305 A1 | 6/2024 | Barrett et al. |
| 2024/0202284 A1 | 6/2024 | Aggarwal et al. |
| 2024/0220966 A1 | 7/2024 | Alva et al. |
| 2024/0265420 A1 | 8/2024 | Glazier et al. |
| 2024/0296275 A1 | 9/2024 | Whitmore et al. |
| 2024/0296276 A1 | 9/2024 | Hattangady et al. |
| 2024/0296278 A1 | 9/2024 | Grimshaw et al. |
| 2024/0296315 A1 | 9/2024 | Singh et al. |
| 2024/0296316 A1 | 9/2024 | Singh et al. |
| 2024/0297856 A1 | 9/2024 | Hattangady et al. |

FOREIGN PATENT DOCUMENTS

| | | |
|---|---|---|
| CN | 112561545 A | 3/2021 |
| DE | 102019117839 A1 | 1/2021 |
| DE | 102021117085 B4 | 10/2023 |
| DE | 102021133489 B4 | 2/2024 |
| EP | 3673471 A1 | 7/2020 |
| EP | 3926551 A1 | 12/2021 |
| KR | 102693273 B1 | 8/2024 |
| WO | 03001754 A1 | 1/2003 |
| WO | 2022257662 A1 | 12/2022 |

* cited by examiner

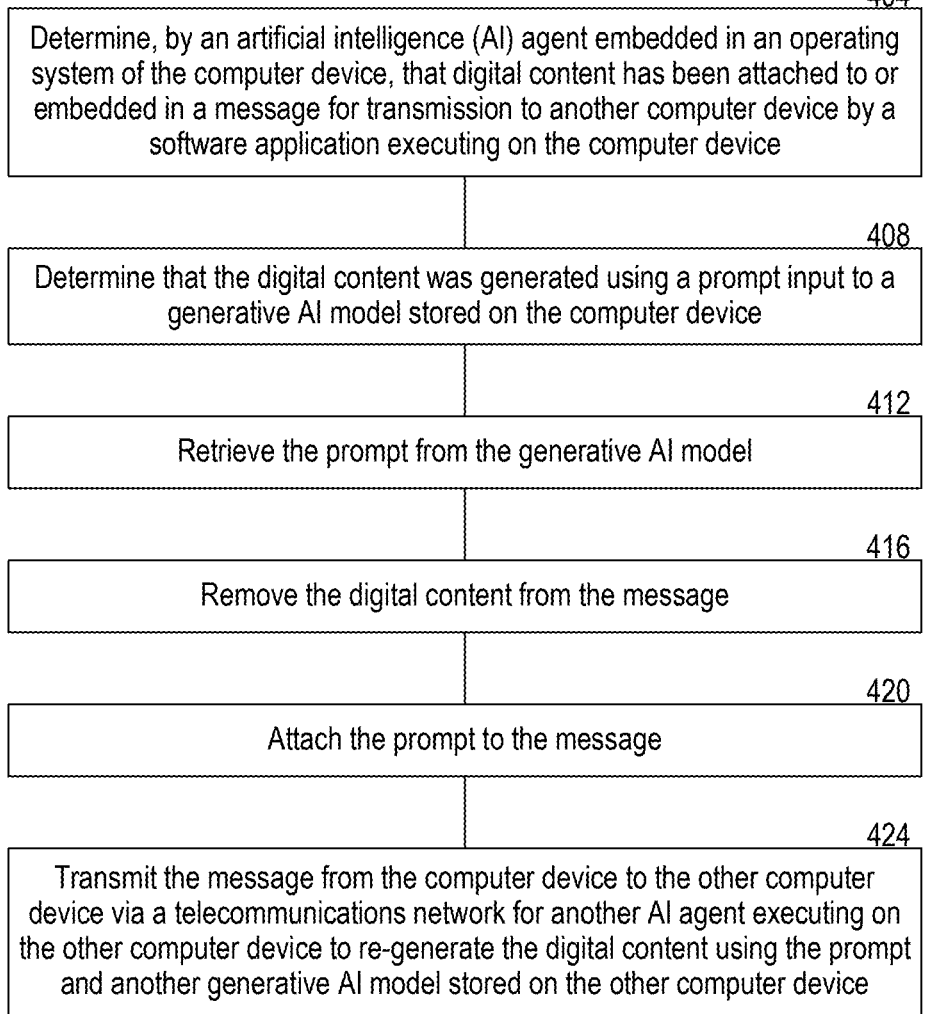

404

Determine, by an artificial intelligence (AI) agent embedded in an operating system of the computer device, that digital content has been attached to or embedded in a message for transmission to another computer device by a software application executing on the computer device

408

Determine that the digital content was generated using a prompt input to a generative AI model stored on the computer device

412

Retrieve the prompt from the generative AI model

416

Remove the digital content from the message

420

Attach the prompt to the message

424

Transmit the message from the computer device to the other computer device via a telecommunications network for another AI agent executing on the other computer device to re-generate the digital content using the prompt and another generative AI model stored on the other computer device

*FIG. 4*

TELECOMMUNICATION USING ARTIFICIAL INTELLIGENCE (AI) AGENTS AND GENERATIVE AI MODELS

BACKGROUND

Next-generation telecommunications networks such as 6G are predicted to be significantly faster than previous generation networks because of improvements in radio interface modulation and coding techniques and physical-layer technologies. Next-generation networks are expected to support a ubiquitous connectivity model including precise location services and extended-reality applications. However, the bandwidth and latency requirements imposed by data-heavy applications such as extended-reality applications and gaming applications can lead to network resource constraints and a diminished user experience. Conventional solutions to reduce bandwidth bottlenecks and improve latency on next-generation telecommunication networks include the use of frequency bands in the Terahertz spectrum. However, the use of a higher-frequency spectrum can necessitate additional cell towers because of the shorter distance of signal propagation, leading to higher hardware costs for data-heavy applications on next-generation telecommunication networks.

BRIEF DESCRIPTION OF THE DRAWINGS

Detailed descriptions of implementations of the present technology will be described and explained through the use of the accompanying drawings.

FIG. 4 is a flowchart that illustrates an example process for telecommunication over next-generation telecommunication networks.

Figure 1:
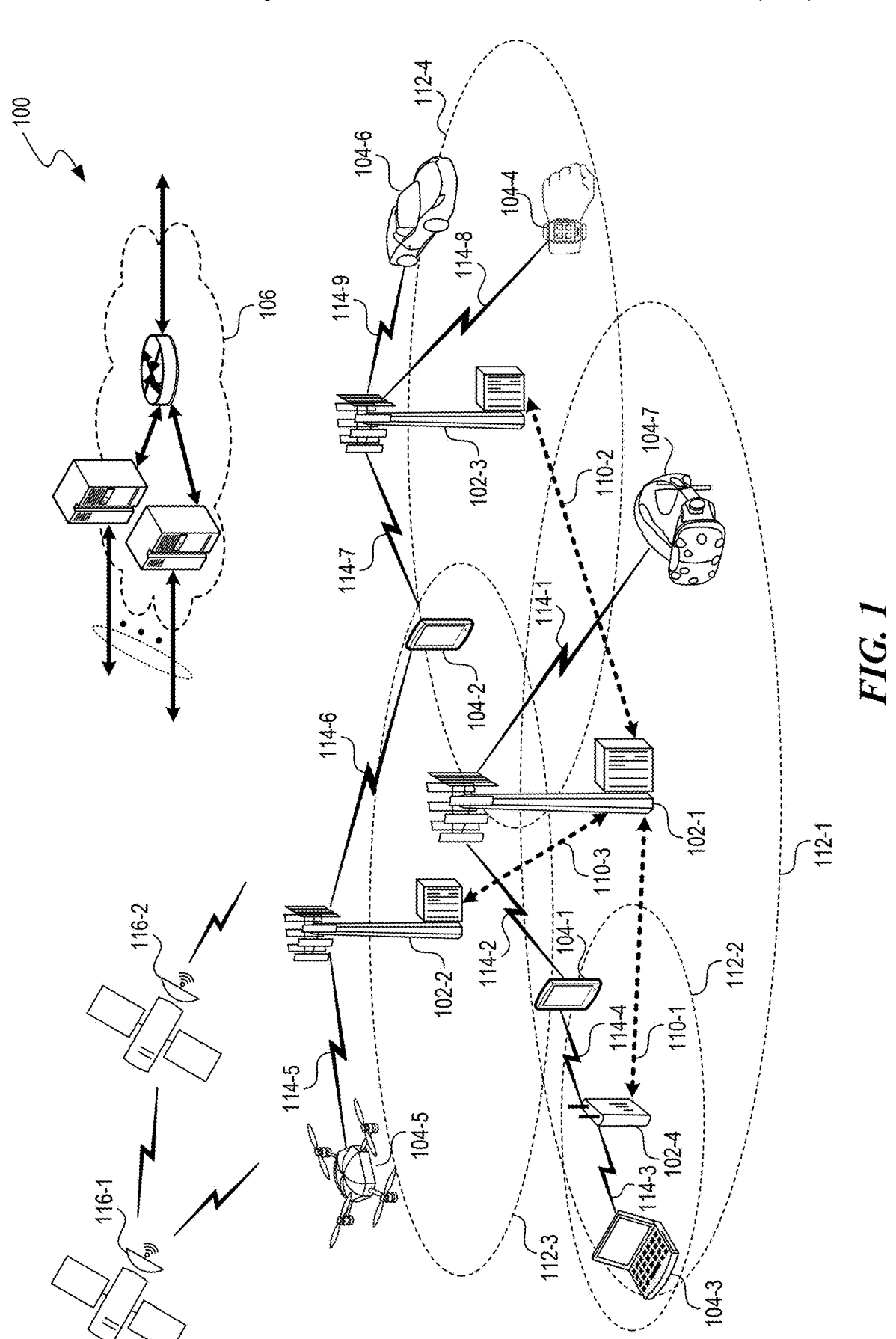
FIG. 1 is a block diagram that illustrates an example wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Next-generation telecommunications networks, such as 6G networks are being designed to support applications beyond current mobile use scenarios. Next-generation networks are expected to support demanding and diverse applications such as ubiquitous instant communications, pervasive intelligence, extended-reality applications, and the highly distributed Internet of things (HDIoT). However, the bandwidth and latency requirements imposed by data-heavy applications, such as extended-reality applications and gaming applications can lead to network resource constraints and a diminished user experience. There is thus a need for new telecommunication technologies that can achieve reduced latency and that require reduced bandwidth for communication over next-generation networks.

This document discloses methods, systems, and apparatuses for telecommunication over next-generation telecommunication networks using (artificial intelligence) AI agents and generative AI models to reduce latency and bandwidth requirements. An AI agent is a program that can be embedded on a computer device to perform tasks on behalf of a user without human intervention. For example, AI agents can analyze data and make decisions, learn from interactions, and act on natural language commands. A generative AI model can be used to generate text, images, videos, or other data, often in response to prompts. Generative AI models learn the patterns and structure of their input training data and then generate new data that has similar characteristics.

In some implementations, an AI agent on a computer device determines that digital content (e.g., an image) has been added to or embedded in a message for transmission to another computer device. Transmitting the digital content over a telecommunications network is associated with a first bandwidth and a first latency. The AI agent determines that the digital content was generated using a prompt input to a generative AI model. The AI agent retrieves the prompt from the generative AI model and replaces the digital content in the message with the prompt. The computer device sends the message to the other computer device for the other computer device to re-generate the digital content using the prompt. Transmitting the prompt instead of the digital content over the telecommunications network is associated with a second bandwidth less than the first bandwidth and second latency less than the first latency.

In some instances, an AI agent determines that digital content has been prepared for communication by a software application (e.g., an e-mail application). The AI agent retrieves the digital content and extracts contextual features from the digital content. The AI agent uses an AI model stored on the computer device to convert the digital content into an information vector based on the contextual features. The information vector is smaller in size than the digital content. The AI agent transmits the information vector over a telecommunications network for a receiving computer device to re-generate the digital content using the information vector. In some instances, an AI agent uses an AI diffusion model to generate a noise vector based on digital content. The AI diffusion model is described by multiple parameters. The noise vector and the multiple parameters are sent from a computer device to another computer device for the other computer device to re-generate the digital content using the noise vector and the multiple parameters. The embodiments described herein perform message transmission with reduced bandwidth requirements.

The benefits and advantages of the implementations described herein include reduced communication latency, enabling users to download high-resolution videos in less time. The disclosed systems also require less communication capacity to support new services and Internet of Things (IoT) development. Further, because of their reduced bandwidth needs, the disclosed apparatuses can support telemedicine using augmented reality and direct video connections. Conventional solutions to reduce bandwidth bottlenecks and improve latency on next-generation telecommunication networks include the use of frequency bands in the Terahertz spectrum. However, the use of a higher-frequency spectrum would necessitate additional cell towers because of the shorter distance of signal propagation, leading to higher hardware costs for data-heavy applications. The implementations for communication using AI agents and generative AI disclosed herein mitigate such hardware costs for next-generation telecommunication networks by reducing bandwidth requirements and improving latency. The implementations described herein are backward-compatible and can be used on LTE and 5G networks to improve latency with less hardware overhead.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
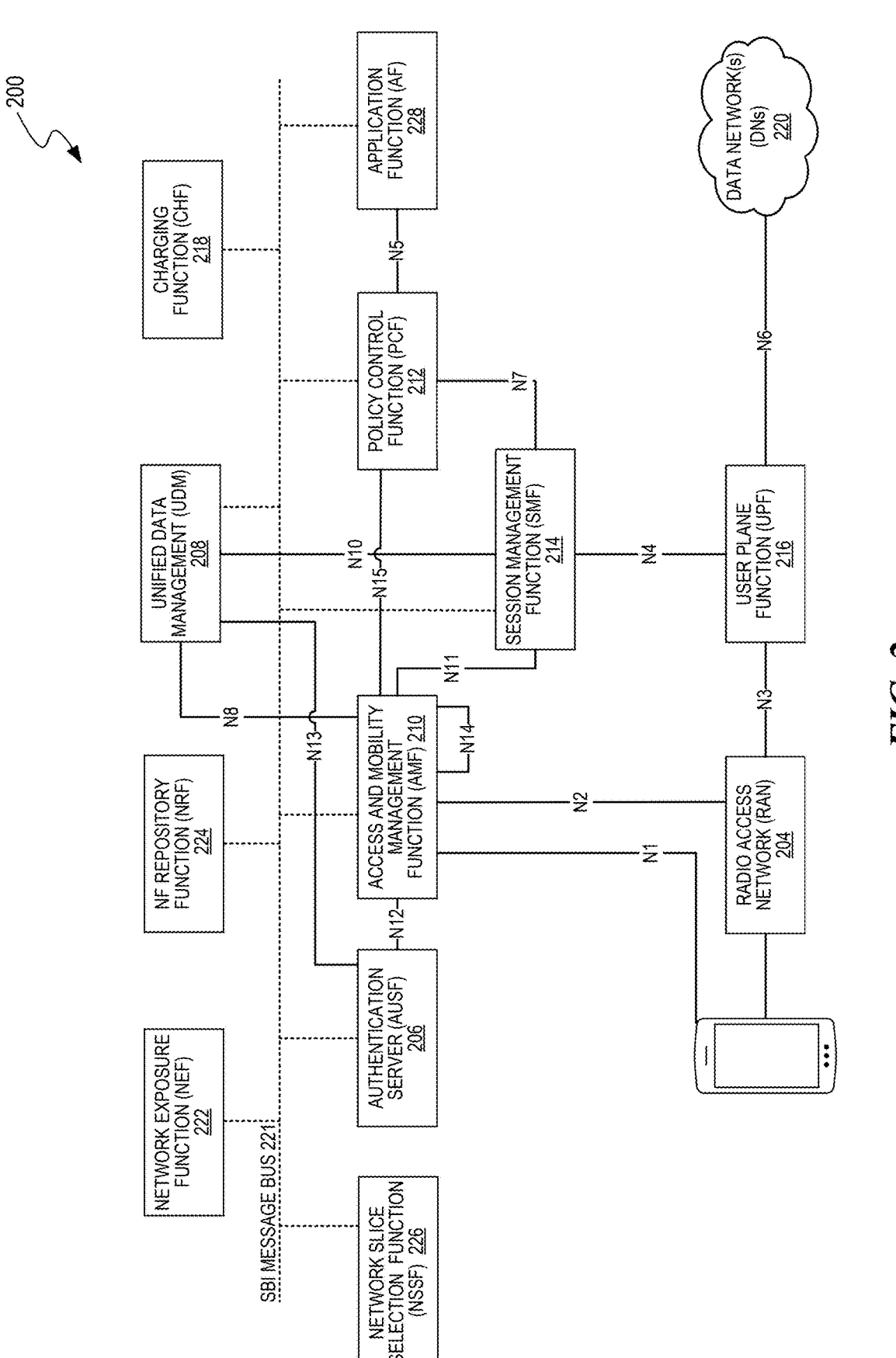
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Telecommunication Using AI Agents and Generative AI Models

Figure 3:
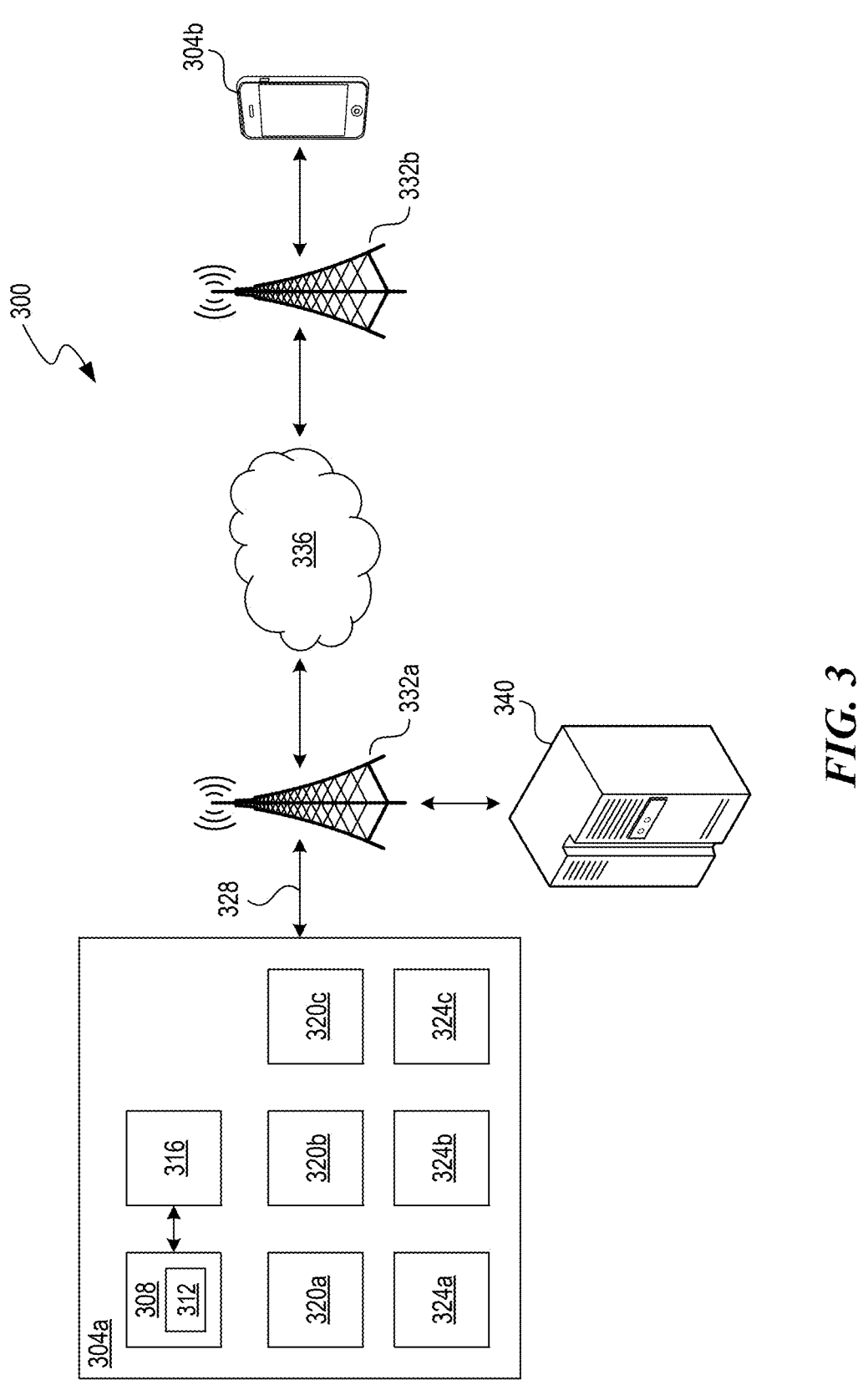
FIG. 3 is a drawing that illustrates an example system for communication over next-generation telecommunication networks using artificial intelligence (AI) agents and generative AI models.

FIG. 3 is a drawing that illustrates an example system 300 for communication over a next-generation telecommunication network 336 using an artificial intelligence (AI) agent 312 and a generative AI model 316. System 300 includes computer devices 304a, 304b, cellular towers 332a, 332b (sometimes referred to as cell sites, cell phone towers, cell base towers, or cellular base stations), computer server 340, and telecommunications network 336. The computer devices 304a, 304b are laptops, desktops, or mobile devices similar to wireless devices 104-1 through 104-7, illustrated and described in more detail with reference to FIG. 1. Network 336 is similar to network 100 illustrated and described in more detail with reference to FIG. 1. The system 300 is implemented using components of example computer system 600 illustrated and described in more detail with reference to FIG. 6. Likewise, embodiments of example system 300 can include different and/or additional components or can be connected in different ways.

In some implementations, the AI agent 312 is embedded in an operating system 308 of the computer device 304a. The AI agent 312 is a program that can be embedded on a computer device to perform tasks on behalf of a user without human intervention. For example, the AI agent 312 can analyze data and make decisions, learn from interactions, and act on natural language commands. The operating system 308 is computer software that manages the computer device's hardware and software resources, acting as a bridge between a user and the physical components of the computer device 304a, providing a user interface and controlling functions such as memory allocation, file management, and process execution. The operating system 308 is a core program that enables other software (e.g., AI agent 308, generative AI model 316) to run on the computer device 304a. In some implementations, the AI agent 312 and the generative AI model 316 are not embedded in the operating system 308 and are stored on non-volatile memory in the computer device 304a from where they are temporarily loaded into the computer device's Random Access Memory for processing.

The AI agent 312 can determine that digital content (e.g., an image, text, an audio clip, or a video clip) has been prepared for communication between the computer device 304a and computer device 304b. The digital content can be an image taken by a camera of computer device 304a or an audio clip recorded by a microphone of computer device 304b). For example, an e-mail application 320a attaches the digital content to an e-mail for sending the e-mail including the digital content to a user of computer device 304b. The e-mail application 320a (sometimes called an email client or message user agent) can provide message management, composition, and reception functions, and can act as a web email client. In some examples, a messaging application 320b embeds the digital content into a rich text message for sending the digital content to a user of computer device 304b. The messaging application 320b can transmit a wider range of data than SMS or MMS, and can include multimedia features (users can send and receive emojis, photos, and other media), file transfer (users can send and receive files), voice calling, and video chat.

In some examples, a social media application 320c embeds the digital content into a post on a social media website accessible by a user of computer device 304b. The social media application 320c is part of a digital platform (e.g., running on server 340) that allows users to connect with others online, share content like text, photos, and videos, interact through comments and likes, and build communities by creating and engaging with posts from other users for online communication and networking. The AI agent 312 can determine that the digital content has been prepared for communication by a software application (e.g., e-mail application 320a, messaging application 320b, or social media application 320c) executing on the computer device 304b. To prepare the digital content for communication, the software application can add metadata to the digital content, label the digital content, compress the digital content, and attach or embed the digital content into a message or data stream.

The software application can also be a gaming application 324a, a telemedicine application 324b, a holographic communication application 324c, any other type of software application, or a combination thereof. The gaming application 324a enables users to play games on a mobile device, desktop, or the web (e.g., running on server 340), and can include features for interacting with computer device 304b (e.g., sending messages including digital content). The gaming application 324a can stress resources of the network 336 because the gaming application 324a requires higher bandwidth for reducing data lag and helping data packets travel quickly between the computer device 304a and a game server (e.g., server 340). In addition, the gaming application 324a requires lower latency for faster loading times, smoother online gameplay, and better streaming quality.

The telemedicine application 324b is a software program that allows patients to receive medical care remotely from a healthcare provider. The telemedicine application 324b can provide remote diagnosis, remote treatment services, and transmission of medical information. The telemedicine application 324b is image-heavy and bandwidth-hungry. The holographic communication application 324c enables real-time, three-dimensional stereoscopic projection of people and/or objects. Holographic communication is a type of extended reality technology that requires higher bandwidths and can stress network resources.

Transmitting the digital content over the telecommunications network 336 is associated with a first bandwidth, e.g., 5 Megabits per second (Mbps) or 10 Mbps. Transmitting the digital content over the telecommunications network 336 is associated with a first latency, e.g., 5 milliseconds (ms) or 10 ms. Conventional solutions to reduce bandwidth bottlenecks and improve latency on next-generation telecommunication networks include the use of frequency bands in the Terahertz spectrum. However, the use of higher frequencies would necessitate additional cell towers because of the shorter distance of signal propagation, leading to higher hardware costs for data-heavy applications on next-generation telecommunication networks. The implementations for communication using AI agents and generative AI disclosed herein mitigate such hardware costs for next-generation telecommunication networks by reducing bandwidth requirements and improving latency. The implementations described herein are backward-compatible and can be used on LTE and 5G networks to improve latency with less hardware overhead.

The AI agent 312 retrieves the digital content from the software application, e.g., once the digital content has been added to a message. For example, the AI agent 312 can parse the message and automatically extract the attached or embedded digital content, and add it to a folder or send it to another program, such as a feature extractor. Feature vector extraction is described in more detail with reference to FIG. 5. The AI agent 312 can use the AI system 500 of FIG. 5 to extract contextual features describing a context of the communication (e.g., between computer devices 304a, 304b) from the digital content.

In some embodiments, the AI system 500 can include a feature extraction module implemented using components of the example computer system 600 illustrated and described in more detail with reference to FIG. 6. In some embodiments, the feature extraction module extracts a feature vector from input data. The feature vector includes n features (e.g., feature a, feature b, . . . , feature n). The feature extraction module reduces the redundancy in the input data, e.g., repetitive data values, to transform the input data into the reduced set of features such as feature vector. The feature vector contains the relevant information from the input data, such that events or data value thresholds of interest can be identified by the AI system 500 by using this reduced representation. In some example embodiments, the following dimensionality reduction techniques are used by the feature extraction module: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

The AI agent 312 can use natural language processing or semantic extraction to extract the contextual features. The context of the communication can describe whether the communication is part of an online game, a business communication (e.g., between an attorney and client), or a personal communication (e.g., between a grandchild and grandparent). The semantics extracted can include an emotional context of the communication (e.g., romantic, sorrowful, or joyous) or a location of computer device 304a (e.g., a library, a restaurant, or a university). The contextual features can be represented by a feature vector. Feature vectors are described in more detail with reference to FIG. 5.

In some implementations, the AI models described herein are continuously, periodically, or in an ad hoc manner re-trained based on the contextual features. The AI agent 312 can regularly collect, examine, and analyze different contexts in which a user of the computer device 304a communicates and the different contexts in which recipients (e.g., computer device 304b) communicate. The AI agent 312, the network 336, or software on server 340 can perform retraining of the generative AI model 316 to learn often used contexts in which the computer device 304a communicates and thus adjust parameters of the generative AI model 316 to improve encoding of the digital content into information vectors for transmission over network 336. Example training methods that can be used are described in more detail with reference to FIG. 5. The generative AI model 316 can be re-trained by the telecommunications network 336. For example, the telecommunications network 336 generates the generative AI model 316 and an AI model used by the computer device 304b and deploys them on the computer device 304a, 304b. A computer system on the radio access network (RAN) of network 336 can then keep retaining the generative AI model 316 and the AI model used by the computer device 304b based on different input data and different context of communication.

In some implementations, the AI agent 312 uses the generative AI model 316 to convert the digital content into an information vector based on the contextual features. Example AI methods to produce information based on feature vectors is described in more detail with reference to FIG. 5. For example, the generative AI model 316 can be used to convert the digital content into a smaller, more dense representation (information vector) of the digital content. This compressed representation preserves the information that's needed for a decoder running on the computer system 304b to reconstruct the original input digital content, while discarding any irrelevant information. The generative AI model 316 can be trained to learn an efficient and simple latent data representation. The AI agent 312 can also use a generative adversarial network (GAN) to convert the digital content into an information vector. For example, the AI agent 312 can pit two neural networks against each other: a generator that generates new examples and a discriminator that learns to distinguish the generated content as either real (from the domain) or synthetic (generated).

The information vector is smaller in size than the digital content and requires less bandwidth to be sent over cell sites 332a, 332b and network 336. For example, the digital content can be an image of 1280×720 pixels in size or a video of 4-16 gigabytes (GB). In such an example, the information vector can be 100 times smaller, 1000 times smaller, or 10,000 times smaller than the digital content. In some implementations, the information vector is a compressed version of the digital content. For example, the information vector can represent a reduced amount of data without losing relevant information. In some example, lossless compression is performed where the information vector maintains the original resolution and detail of the digital content. In some implementations, an AI model uses neural network-based compression to learn from data and adapt to the specific characteristics of the digital image. An AI model can also use machine learning algorithms to compress the digital content by assigning different bitrates to different parts of the digital content.

The information vector can be a noise vector. For example, a diffusion model can generate the information vector by adding random noise to the digital content. The computer device 304b can then transform the noise vector into a structured output. The information vector can be a prompt. For example, the generative AI model 316 can be used to reverse engineer the digital content to a prompt. The prompt can include commands, instructions, questions, keywords, code snippets, and/or writing samples.

The AI agent 312 can replace the digital content with the information vector (e.g., within a pending message) for the communication to be sent from computer device 304a. The software application performing the communication transmits the information vector (either standalone or as part of a message) from the computer device 304a to the computer device 304b for the computer device 304b to re-generate the digital content using the information vector. For example, the information vector is transmitted by an extended reality application, gaming application 324a, telemedicine application 324b, or a holographic communication application 324c to the computer device 304b. In some examples, the information vector is transmitted by e-mail application 320a, messaging application 320b, or social media application 320c. In some examples, the computer device 304b uses an AI model stored on the computer device 304b, the network 336, or the server 340 to regenerate the digital content. In some implementations, the computer device 304b uses an AI model stored on a radio access network or a 6G core.

The AI model used by the computer device 304b can be another generative AI model (that is trained differently than the generative AI model 316) or a different type of AI model. For example, the AI model used by the computer device 304b can be a diffusion model or an autoencoder. An autoencoder is a type of artificial neural network that can learn efficient encodings of unlabeled data. An autoencoder learns two functions: an encoding function that transforms the digital content, and a decoding function that recreates the digital content from the encoded representation.

Either of the generative AI model 316 or the AI model used by the computer device 304b can be re-trained based on the digital content, messaging between the computer devices 304a, 304b, and/or the different contexts in which the computer devices 304a, 304b communicate. The generative AI model 316 and the AI model used by the computer device 304b can thus have different model parameters because they can be trained differently or on different training data. For example, the computer devices 304a, 304b can have different Euclidean spaces of encoded and decoded messages, weights, biases, layers, coefficients, etc.

In some implementations, the generative AI model 316 is an AI diffusion model described by multiple parameters. The generative AI model 316 can use noise to create synthetic data, such as images and audio. The generative AI model 316 can add random noise to the digital content, transform the noise into a structured output, learn how to reverse the process of adding noise, and apply the reverse operation to new random data to produce new outputs. The parameters of the generative AI model 316 can include drift rate (the speed and direction of information accumulation), threshold separation (also known as boundary separation, this parameter is a speed-accuracy setting), starting point (also known as response bias, this parameter is the starting point of the model), non-decision time, coefficient of innovation, coefficient of imitation, or potential market size. The parameters of the generative AI model 316 can be different from the parameters of the AI model used by the computer device 304b.

The generative AI model 316 is used to generate a noise vector from the digital content or convert the digital content into a noise vector. In some implementations, the computer device 304a transmits the noise vector and the multiple parameters from the computer device 304a to computer device 304b for computer device 304b to re-generate the digital content using the noise vector and the multiple parameters of generative AI model 316. Transmitting the noise vector and the multiple parameters over the telecommunications network 336 is associated with a second bandwidth (e.g., 0.5 Mbps or 1 Mbps) less than the first bandwidth and a second latency (e.g., 0.5 ms or 1 ms) less than the first latency.

FIG. 4 is a flowchart that illustrates an example process for telecommunication over next-generation telecommunication networks. In some implementations, the process is performed by the computer devices 304a, 304b illustrated and described in more detail with reference to FIG. 3. In some implementations, the process is performed by a computer system, e.g., example computer system 600 illustrated and described in more detail with reference to FIG. 6. Particular entities, for example, computer server 340 or network 336 perform some or all of the steps of the process in other implementations. Computer server 340 and network 336 are illustrated and described in more detail with reference to FIG. 3. Likewise, implementations can include different and/or additional steps or can perform the steps in different orders.

At 404, an AI agent (e.g., AI agent 312 shown by FIG. 3) is embedded in an operating system (e.g., operating system 308) of a computer device (e.g., computer device 304a). The AI agent determines that digital content has been attached to or embedded in a message for transmission to another computer device (e.g., computer device 304b) by a software application (e.g., e-mail application 320a) executing on the computer device. The digital content can include an image, a video, and/or a music clip.

The software application can be an e-mail application, a messaging application, and/or a social media application. The software application can be an extended reality application, a gaming application, a telemedicine application, and/or a holographic communication application. Transmitting the message including the digital content over a tele-communications network (e.g., network 336) is associated with a first bandwidth, e.g., 5 Mbps or 10 Mbps. Transmitting the message including the digital content over the telecommunications network is associated with a first latency, e.g., 5 ms or 10 ms.

At 408, the AI agent determines that the digital content was generated using a prompt input to a generative AI model (e.g., generative AI model 316) stored on the computer device. In some implementations, the generative AI model is a small language model (SLM). For example, the generative AI model is trained to understand and generate human-like text. In some examples, the generative AI model can be smaller and less complex than a large language model (LLM). For example, the generative AI model has fewer parameters and a simpler architecture, and is trained on smaller, more specific datasets. The generative AI model can be more efficient and easier to deploy than LLMs. In some implementations, knowledge distillation can be used to transfer knowledge from an LLM to the generative AI model.

At 412, the AI agent retrieves the prompt from the generative AI model. The prompt can include commands, instructions, questions, keywords, code snippets, and/or writing samples. The generative AI model can be a multimodal AI model. For example, the generative AI model can process multiple types of data to produce more accurate results. Multimodal AI models can combine information from various sources, such as text, images, audio, and video, to generate content, make predictions, and form insights.

At 416, the AI agent removes the digital content from the message. For example, the AI agent parses the message and automatically extracts the attached or embedded digital content and adds it to a folder or sends it to another program, such as a feature extractor.

At 420, the AI agent attaches the prompt to the message. For example, a pointer or link to the prompt can be added to the message while the prompt is stored online. In some examples, the AI prompt is embedded in the message.

At 424, the AI agent transmits the message from the computer device to the other computer device via the telecommunications network for another AI agent executing on the other computer device to re-generate the digital content using the prompt and another generative AI model stored on the other computer device. Transmitting the message including the prompt over the telecommunications network is associated with a second bandwidth (e.g., 0.5 Mbps or 1 Mbps), which is less than the first bandwidth and a second latency (e.g., 0.5 ms or 1 ms less than the first latency.

Figure 5:
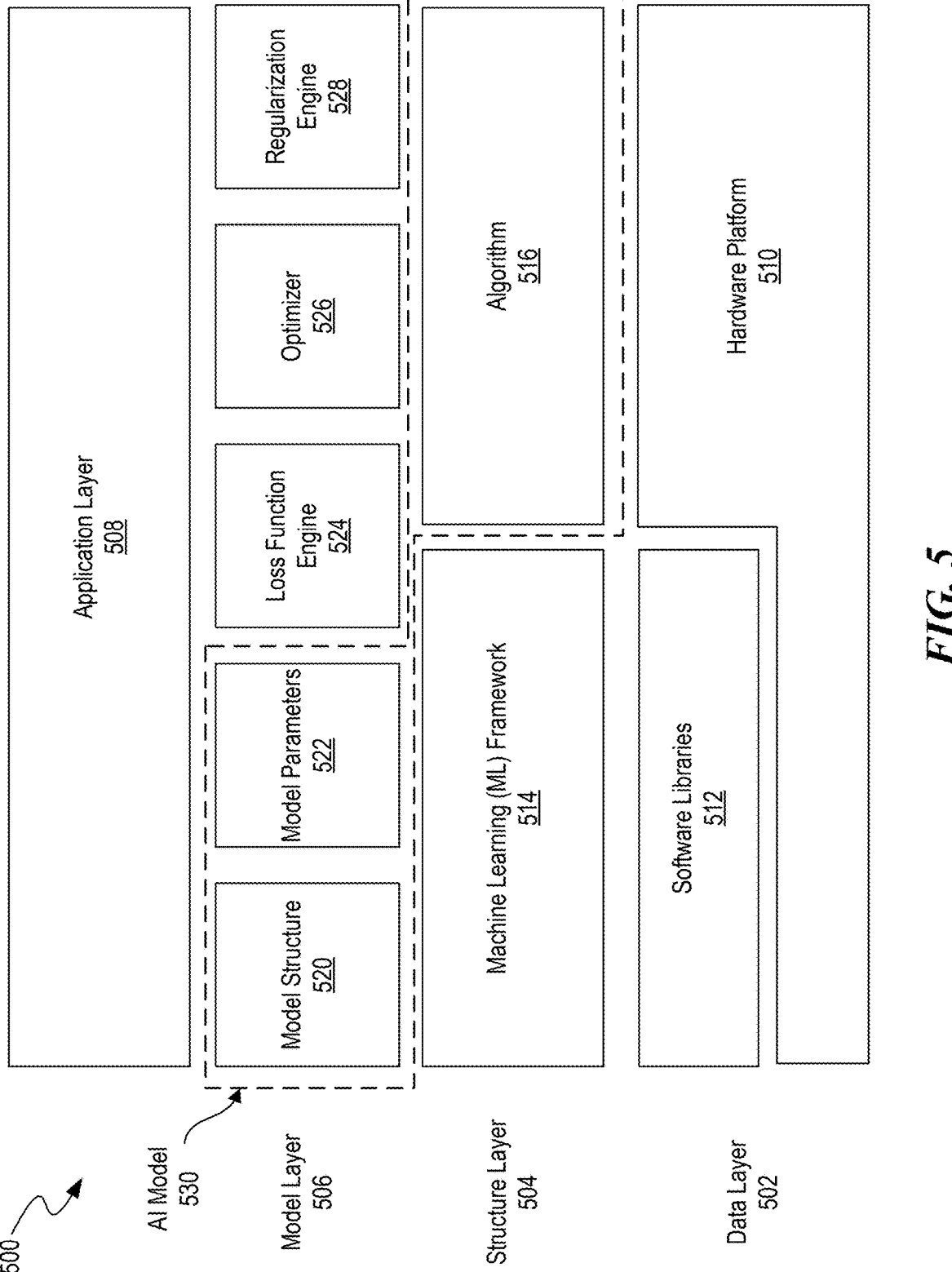
FIG. 5 is a block diagram that illustrates an example AI system that can implement aspects of the present technology.

FIG. 5 is a block diagram that illustrates an example AI system 500 that can implement aspects of the present technology. The AI system 500 is implemented using components of the example computer system 600 illustrated and described in more detail with reference to FIG. 6. For example, the AI system 500 can be implemented on the processor 602 using instructions 608 programmed in the memory 606 illustrated and described in more detail with reference to FIG. 6. Likewise, implementations of the AI system 500 can include different and/or additional components or be connected in different ways. FIG. 5 illustrates a layered architecture of AI system 500 that can implement the AI models of the system 300 of FIG. 3, in accordance with some implementations of the present technology. Accordingly, the AI agent 312 and generative AI model 316 can include one or more components of the AI system 500.

As shown, the AI system 500 can include a set of layers, which conceptually organize elements within an example network topology for the AI system's architecture to implement a particular AI model 530. Generally, an AI model 530 is a computer-executable program implemented by the AI system 500 that analyses data to make predictions. Information can pass through each layer of the AI system 500 to generate outputs for the AI model 530. The layers can include a data layer 502, a structure layer 504, a model layer 506, and an application layer 508. The algorithm 516 of the structure layer 504 and the model structure 520 and model parameters 522 of the model layer 506 together form an example AI model 530. The optimizer 526, loss function engine 524, and regularization engine 528 work to refine and optimize the AI model 530, and the data layer 502 provides resources and support for application of the AI model 530 by the application layer 508.

The data layer 502 acts as the foundation of the AI system 500 by preparing data for the AI model 530. As shown, the data layer 502 can include two sub-layers: a hardware platform 510 (e.g., the computer devices 304a, 304b, server 340, and network 336 described in more detail with reference to FIG. 3) and one or more software libraries 512. The hardware platform 510 can be designed to perform operations for the AI model 530 and include computing resources for storage, memory, logic and networking, such as the resources described in relation to FIG. 6. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider. The hardware platform 510 can also include computer memory for storing data about the AI model 530, application of the AI model 530, and training data for the AI model 530. The computer memory can be a form of random-access memory (RAM), such as dynamic RAM, static RAM, and non-volatile RAM.

The software libraries 512 can be thought of suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that allows users to build and deploy the AI model 530. The ML framework 514 can include an open-source library, an application programming interface (API), a gradient-boosting library, an ensemble method, and/or a deep learning toolkit that work with the layers of the AI system facilitate development of the AI model 530. For example, the ML framework 514 can distribute processes for application or training of the AI model 530 across multiple resources in the hardware platform 510. The ML framework 514 can also include a set of pre-built components that have the functionality to implement and train the AI model 530 and allow users to use pre-built functions and classes to construct and train the AI model 530. Thus, the ML framework 514 can be used to facilitate data engineering, development, hyperparameter tuning, testing, and training for the AI model 530. Examples of ML frameworks 514 that can be used in the AI system 500 include TENSORFLOW, PYTORCH, SCIKIT-LEARN, KERAS, LightGBM, RANDOM FOREST, and AMAZON WEB SERVICES.

The algorithm 516 can be an organized set of computer-executable operations used to generate output data from a set of input data and can be described using pseudocode. The algorithm 516 can include complex code that allows the computing resources to learn from new input data (e.g., the digital content described in more detail with reference to FIG. 3) and create new/modified outputs based on what was learned. In some implementations, the algorithm 516 can build the AI model 530 through being trained while running computing resources of the hardware platform 510. This training allows the algorithm 516 to make predictions or decisions without being explicitly programmed to do so. Once trained, the algorithm 516 can run at the computing resources as part of the AI model 530 to make predictions or decisions, improve computing resource performance, or perform tasks. The algorithm 516 can be trained using supervised learning, unsupervised learning, semi-supervised learning, and/or reinforcement learning.

Using supervised learning, the algorithm 516 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of content from a user of computer device 304*a*) from various source computing systems described in relation to FIG. 1. For example, instead of using conventional digital images, the data can include raw analog signal values of captured images and their parameters. Furthermore, training data can include pre-processed data generated by various engines of the system 300 described in relation to FIG. 3. The user may label the training data based on one or more classes and trains the AI model 530 by inputting the training data to the algorithm 516. The algorithm determines how to label the new data based on the labeled training data. The user can facilitate collection, labeling, and/or input via the ML framework 514. In some instances, the user may convert the training data to a set of feature vectors for input to the algorithm 516. Once trained, the user can test the algorithm 516 on new data to determine if the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can involve classification and/or regression. Classification techniques involve teaching the algorithm 516 to identify a category of new observations based on training data and are used when input data for the algorithm 516 is discrete. Said differently, when learning through classification techniques, the algorithm 516 receives training data labeled with categories (e.g., classes) and determines how features observed in the training data (e.g., images, text, video clips, audio clips, or social media posts) relate to the categories (e.g., a professional context, a romantic conversation, or an educational context). Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format. The computer devices 304*a*, 304*b* can use unsupervised learning to identify patterns in digital content history (e.g., to identify particular video sequences) and so forth. In some implementations, performance of the generative AI model 316 that can use unsupervised learning is improved because the incoming data from the AI agent 312 and/or the network 336 is pre-processed and reduced, based on the relevant context, as described herein.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of training on the latent variables and that the observable variables have nothing in common after controlling for the latent variables. Examples of latent variable techniques that may be used by the algorithm 516 include factor analysis, item response theory, latent profile analysis, and latent class analysis.

The model layer 506 implements the AI model 530 using data from the data layer and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model 530 of the AI system 500. The model structure 520 defines the complexity of the pattern/relationship that the AI model 530 expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how a node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model 530 and the actual output of the AI model 530 and is used to guide optimization of the AI model 530 during training to minimize the loss function. The loss function may be presented via the ML framework 514, such that a user can determine whether to retrain or otherwise alter the algorithm 516 if the loss function is over a threshold. In some instances, the algorithm 516 can be retrained automatically if the loss function is greater than the threshold. Examples of loss functions include a binary-cross entropy function, hinge loss function, regression loss function (e.g., mean square error, or quadratic loss), mean absolute error function, smooth mean absolute error function, log-cosh loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model 530. Overfitting occurs when the algorithm 516 is overly complex and too adapted to the training data, which can result in poor performance of the AI model 530. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constraint the resulting AI model 530 and improves its ability for generalized application. Examples of regularization techniques include lasso (L1) regularization, ridge (L2) regularization, and elastic (L1 and L2 regularization).

The application layer 508 describes how the AI system 500 is used to solve problem or perform tasks. In an example implementation, the application layer 508 can include the AI agent 312 of the computer device 304a.

Computer System

Figure 6:
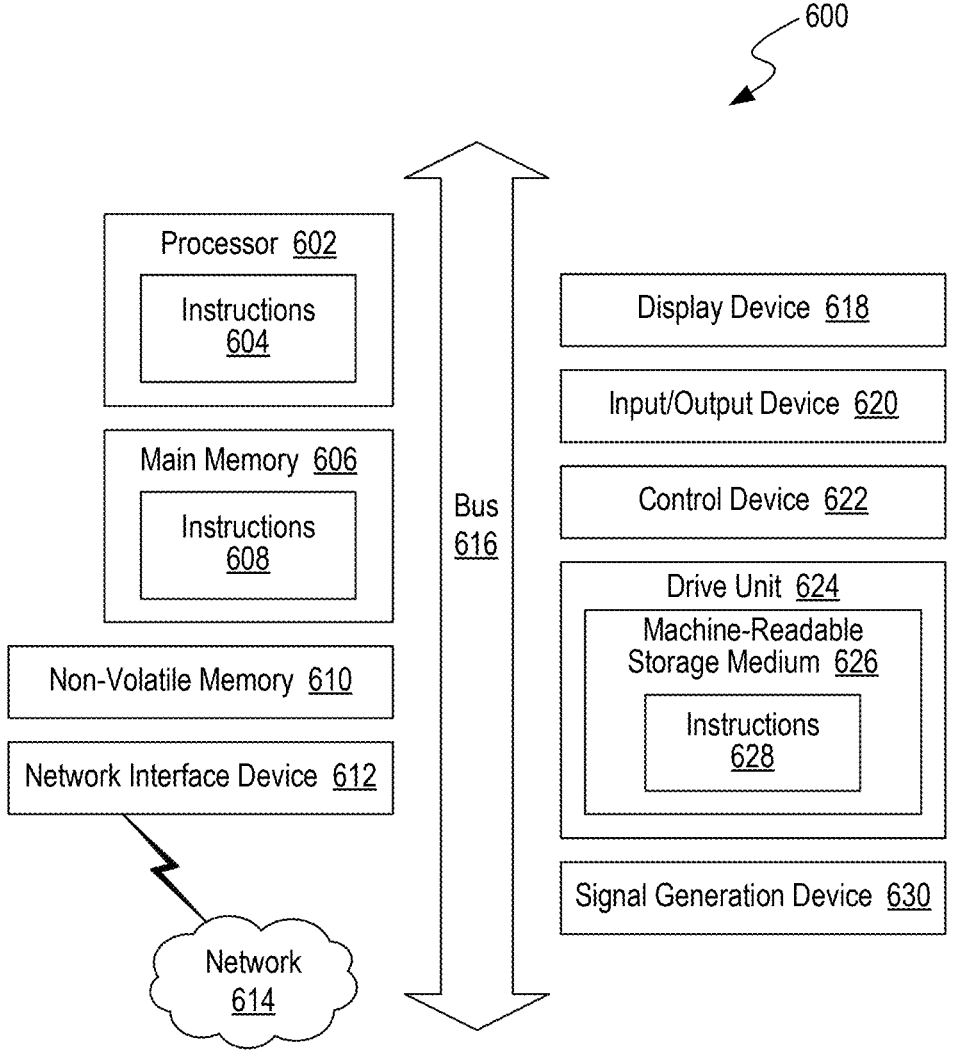
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation;

and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following examples should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer device comprising:
at least one hardware processor; and
at least one non-transitory memory storing instructions, which, when executed by the at least one hardware processor, cause the computer device to:
determine, by an artificial intelligence (AI) agent embedded in an operating system of the computer device, that digital content has been attached to or embedded in a message for transmission to another computer device by a software application executing on the computer device,
wherein transmitting the message including the digital content over a telecommunications network is associated with a first bandwidth and a first latency;
determine that the digital content was generated using a prompt input to a generative AI model stored on the computer device;
retrieve the prompt from the generative AI model;
remove the digital content from the message;
attach the prompt to the message; and
transmit the message from the computer device to the other computer device via the telecommunications network for another AI agent executing on the other computer device to re-generate the digital content using the prompt and another generative AI model stored on the other computer device,
wherein transmitting the message including the prompt over the telecommunications network is associated with a second bandwidth less than the first bandwidth and a second latency less than the first latency.

2. The computer device of claim 1, wherein the software application is an e-mail application, a messaging application, and/or a social media application.

3. The computer device of claim 1, wherein the software application is an extended reality application, a gaming application, a telemedicine application, and/or a holographic communication application.

4. The computer device of claim 1, wherein the digital content includes an image, a video, and/or a music clip.

5. The computer device of claim 1, wherein the generative AI model is a small language model.

6. The computer device of claim 1, wherein the generative AI model is re-trainable by the telecommunications network.

7. The computer device of claim 1, wherein the generative AI model is a multimodal AI model.

8. At least one non-transitory computer-readable storage medium storing instructions, which, when executed by at least one data processor of a computer device, cause the computer device to:
determine, by an artificial intelligence (AI) agent embedded in an operating system of the computer device, that digital content has been prepared for communication between the computer device and another computer device by a software application executing on the computer device;
retrieve the digital content from the software application;
extract contextual features describing a context of the communication from the digital content;
convert, by an AI model stored on the computer device, the digital content into an information vector based on the contextual features,
wherein the information vector is smaller than the digital content;
replace the digital content with the information vector for the communication; and
transmit the information vector from the computer device to the other computer device for the other computer device to re-generate the digital content using the information vector and another AI model.

9. The non-transitory computer-readable storage medium of claim 8, wherein the information vector is one of a compressed version of the digital content, a noise vector, or a prompt.

10. The non-transitory computer-readable storage medium of claim 8, wherein the AI model is an autoencoder.

11. The non-transitory computer-readable storage medium of claim 8, wherein the other AI model is stored on one of the other computer device, a radio access network, or a 6G core.

12. The non-transitory computer-readable storage medium of claim 8, wherein parameters of the AI model are different from parameters of the other AI model.

13. The non-transitory computer-readable storage medium of claim 8, wherein the AI model is a generative AI model.

14. The non-transitory computer-readable storage medium of claim 8, wherein the AI model is re-trainable based on the contextual features.

15. A method performed by a computer device, the method comprising:
determining, by an artificial intelligence (AI) agent executing on the computer device, that digital content has been prepared for transmission by the computer device across a telecommunications network, wherein transmitting the digital content over the telecommunications network is associated with a first bandwidth and a first latency;

generating, using an AI diffusion model stored on the computer device, a noise vector based on the digital content, wherein the AI diffusion model is described by multiple parameters;

transmitting the noise vector and the multiple parameters from the computer device to another computer device for the other computer device to re-generate the digital content using the noise vector and the multiple parameters, wherein transmitting the noise vector and the multiple parameters over the telecommunications network is associated with a second bandwidth less than the first bandwidth and a second latency less than the first latency.

16. The method of claim 15, wherein the generative AI model is re-trainable by the telecommunications network.

17. The method of claim 15, wherein the AI agent is embedded in an operating system of the computer device.

18. The method of claim 15, wherein the digital content was added to a message for the transmission to the other computer device by a software application executing on the computer device.

19. The method of claim 15, wherein the noise vector is transmitted by an extended reality application, a gaming application, a telemedicine application, and/or a holographic communication application.

20. The method of claim 15, wherein the noise vector is transmitted by an e-mail application, a messaging application, and/or a social media application.

* * * * *